US008270394B1

(12) United States Patent
Chen et al.

(10) Patent No.: US 8,270,394 B1

(45) **Date of Patent: *Sep. 18, 2012**

(54) METHOD AND APPARATUS FOR REDUCING AN INTERFERENCE SIGNAL IN A COMMUNICATION SYSTEM

(75) Inventors: Xiaopeng Chen, Sunnyvale, CA (US); Runsheng He, Sunnyvale, CA (US)

(73) Assignee: Marvell International Ltd., Hamilton (BM)

(*) Notice: Subject to any disclaimer, the term of this patent is extended or adjusted under 35 U.S.C. 154(b) by 632 days.

This patent is subject to a terminal disclaimer.

(21) Appl. No.: 12/345,440

(22) Filed: Dec. 29, 2008

Related U.S. Application Data

(63) Continuation of application No. 10/762,153, filed on Jan. 20, 2004, now Pat. No. 7,471,670.

(51) Int. Cl.
*H04B 1/06* (2006.01)

(52) U.S. Cl. ........ 370/352; 370/210; 370/291; 370/201; 370/286; 455/296; 375/232; 375/285

(58) Field of Classification Search .................. 455/296; 370/210, 352, 291, 201, 286; 375/232, 285
See application file for complete search history.

(56) References Cited

U.S. PATENT DOCUMENTS 6,144,710 A * 11/2000 Chen et al. .................... 375/346
6,385,176 B1 * 5/2002 Iyengar et al. ................ 370/286
6,452,967 B1 * 9/2002 Druilhe ......................... 375/232
6,553,085 B1 4/2003 Trans
6,584,159 B1 6/2003 Azadet et al.
6,597,732 B1 7/2003 Dowling
6,775,529 B1 * 8/2004 Roo .............................. 455/296
6,894,989 B1 5/2005 Chadha et al.
6,970,415 B1 * 11/2005 Galarza et al. ................ 370/201
6,985,099 B1 * 1/2006 Luz et al. ...................... 341/139
7,002,897 B2 * 2/2006 Jones et al. ................... 370/201
2004/0213146 A1 10/2004 Jones et al.
2005/0088961 A1 4/2005 Tellado et al.

OTHER PUBLICATIONS

IEEE Computer Society, IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications, IEEE Std. 802.3—2002.

* cited by examiner

*Primary Examiner* — Sanh Phu

(57) ABSTRACT

Methods and apparatus describe techniques for reducing interference signals in a communication signal. An apparatus includes, in at least one aspect, a transceiver circuit to receive a communication signal that includes one or more interference signals and a compensation circuit to generate a compensation signal to compensate for the one or more interference signals in the communication signal based on one or more cancellation coefficients and one or more data symbols.

34 Claims, 9 Drawing Sheets

METHOD AND APPARATUS FOR REDUCING AN INTERFERENCE SIGNAL IN A COMMUNICATION SYSTEM

CROSS-REFERENCE TO RELATED APPLICATION

This application is a continuation application of and claims priority to U.S. application Ser. No. 10/762,153, filed on Jan. 20, 2004.

BACKGROUND

The following disclosure relates to electrical circuits.

A communication system (e.g., a local area network) allows communication between two or more network devices. FIG. 1 illustrates an example communication system 100 that includes a network device 102 and a network device 104. Network devices 102, 104 include computers, switches, routers, hubs, gateways, and similar devices (e.g., devices having a network interface card in a network). Though two network devices are illustrated in FIG. 1 by way of example, communication system 100 can contain a different number of network devices.

Referring to FIG. 2, communication between network device 102 and network device 104 can be conventionally achieved using a communication line 106, formed by unshielded twisted pairs (UTP) of wires (or cables), and transceivers 108-122, one transceiver positioned at each end of a UTP. For example, four UTPs 124-130 are provided in communication line 106 between network device 102 and network device 104. Hybrid circuits 132-146 (e.g., transformers) can be used at the ends of each UTP 124-130 to control access to a corresponding communication channel for full-duplex bidirectional operation. The combination of a hybrid circuit and a transceiver forms one communication channel. Accordingly, FIG. 2 illustrates four channels of communication, each operating in a similar manner. Each UTP 124-130 is connected to a corresponding transceiver through connectors 148-162.

A common problem associated with a communication system using multiple UTPs and multiple transceivers is noise in the form of interference signals. The interference signals include echo and near-end crosstalk (NEXT). As a result of these interference signals, the performance of transceivers, in particular the receivers, in a communication system is degraded.

An echo interference signal can be produced by each transmitter contained within the same transceiver as a given receiver. Echo interference signals 302-316 encountered by respective receivers R1-R8 (of transceivers 108-122) are shown in FIG. 3. Echo interference signals 302-316 appear as noise to receivers R1-R8, which are attempting to detect a direct communication signal (e.g., a data symbol) from a transmitter T1-T8 connected at the opposite end of the communication channel. Accordingly, communication signals received by receivers R1-R8 of transceivers 108-122 may experience signal distortion due to echo interference signals 302-316.

NEXT is an interference signal that results from capacitive coupling of signals from a near-end transmitter to the input of a receiver. For example, NEXT interference signals 402-406 encountered by receiver R1 of transceiver 108 are shown in FIG. 4. NEXT interference signals 402-406 appear as noise at the input of receiver R1, which is attempting to detect a direct communication signal from transmitter T5 of transceiver 116. Each of receivers R1-R8 of transceivers 108-122 may encounter the same effect, and accordingly the communication signals received by receivers R1-R8 may also experience signal distortion due to NEXT interference signals. FIG. 5 shows an example time domain representation of echo and NEXT interference signals encountered by receiver R1 of transceiver 108. Echo and NEXT interference signals caused by a reflection due to impedance mismatch at hybrid circuit 132 and connector 148 are identified as the high voltage responses close to zero time.

SUMMARY

In general, in one aspect, this specification describes a transceiver. The transceiver includes a receiver to receive an analog communication signal. The analog communication signal contains an interference signal. The transceiver includes a digital compensation circuit to generate a digital replica of the interference signal contained in the analog communication signal, a converter to convert the digital replica of the interference signal into a corresponding analog replica of the interference signal, and a subtraction circuit to subtract the analog replica of the interference signal from the analog communication signal.

Particular implementations may include one or more of the following features. The digital compensation circuit can include an echo canceller to generate a digital replica of an echo interference signal in the analog communication signal. The digital compensation circuit can further include a near-end crosstalk (NEXT) canceller to generate a digital replica of a NEXT interference signal in the analog communication signal. The transceiver can further include an analog-to-digital converter (ADC) to sample the analog communication signal having the analog replica subtracted therefrom, and generate a digital signal that is substantially devoid of the interference signal. The transceiver can further include a first-in-first-out (FIFO) buffer to receive the digital signal and store the digital signal on a first-in-first-out basis. The transceiver can further include a feed forward equalizer (FFE) to receive the digital signals from the FIFO buffer, the FFE operable to filter individual digital signals. The FFE can be a least means square (LMS) type adaptive filter. The transceiver can further include a data detector to detect data from the filtered individual digital signals. The data detector can be a Viterbi detector. The data can be a data symbol.

In general, in another aspect, this specification describes a method for reducing interference signals in an analog communication signal. The method includes receiving an analog communication signal through a receiver. The analog communication signal contains an interference signal. The method further includes generating a digital replica of the interference signal contained in the analog communication signal, converting the digital replica of the interference signal into a corresponding analog replica of the interference signal, and subtracting the analog replica of the interference signal from the analog communication signal to substantially cancel the interference signal from the analog communication signal.

Particular implementations may include one or more of the following features. The interference signal can be an echo interference signal or a near end crosstalk (NEXT) interference signal. Generating a digital replica of the interference signal can include determining cancellation coefficients that model an impulse response of the interference signal, and multiplying the cancellation coefficients with a communication signal from a transmitter that causes the interference signal. Determining cancellation coefficients can include determining cancellation coefficients using an adaptive filter. The method can further include sampling the analog communication signal having the analog replica subtracted therefrom with an analog-to-digital converter (ADC) to create a digital communication signal. Generating a digital replica of the interference signal can include generating a digital replica of a portion of the interference signal. The portion of the interference signal can include high voltage portions of the interference signal.

In general, in another aspect, this specification describes a network device in a communication system. The network device includes a transceiver operable to receive an analog communication signal containing an interference signal. The transceiver includes a receiver to receive the analog communication signal, a digital compensation circuit to generate a digital replica of the interference signal contained in the analog communication signal, a converter to convert the digital replica of the interference signal into a corresponding analog replica of the interference signal, and a subtraction circuit to subtract the analog replica of the interference signal from the analog communication signal.

In general, in another aspect, this specification describes a cancellation system for use in a communication system including a communication line. The communication line has a transmitter and a receiver at each end. The cancellation system reduces interference signals in an analog communication signal received by a receiver. The cancellation system includes an echo canceller associated with a receiver. The echo canceller receives a transmitted signal from a transmitter in a same transceiver as the receiver with which the echo canceller is associated. The echo canceller is operable to generate a digital replica echo interference signal. The cancellation systems further includes a converter to convert the digital replica of the echo interference signal into a corresponding analog replica of the echo interference signal, and a subtractor to subtract the replica echo interference signal from an analog communication signal received by the receiver.

In general, in another aspect, this specification describes a cancellation system for use in a communication system including a communication line. The communication line has a transmitter and a receiver at each end. The cancellation system reduces interference signals in an analog communication signal received by a receiver. The cancellation system includes a NEXT canceller associated with a receiver. The NEXT canceller receives a transmitted signal from a local transmitter. The NEXT canceller is operable to generate a digital replica NEXT interference signal. The cancellation system further includes a converter to convert the digital replica of the NEXT interference signal into a corresponding analog replica of the NEXT interference signal, and a subtractor to subtract the replica NEXT interference signal from an analog communication signal received by the receiver.

At high frequencies, echo and NEXT interference signals become a significant portion of a received communication signal. The systems and techniques described in this specification remove high voltage portions of echo and NEXT interference signals in a received communication signal prior to the received communication signal being sampled by an analog-to-digital converter. Bit resolution of the analog-to-digital converter is therefore preserved. Specifically, for high throughput systems, the effective number of bits (ENOB) is a critical design parameter.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
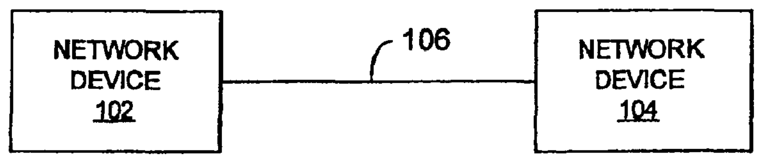
FIG. 1 is a schematic block diagram of a conventional communication system.
Figure 5:
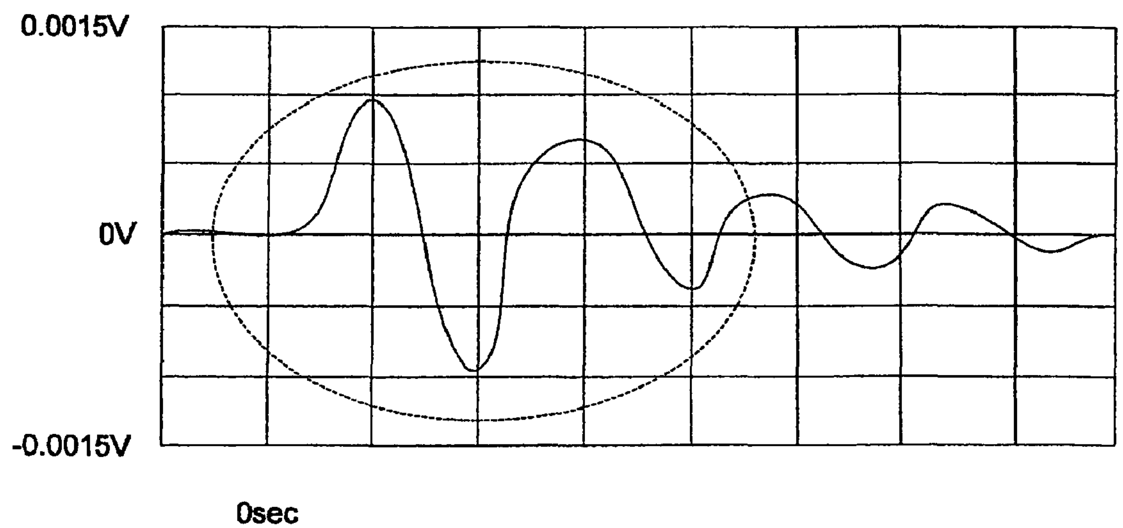
FIG. 5 is a graph showing echo and NEXT interference signals of a communication channel.
Figure 6:
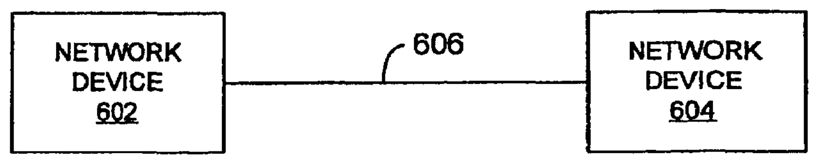
FIG. 6 is a schematic block diagram of a communication system.
Figure 2:
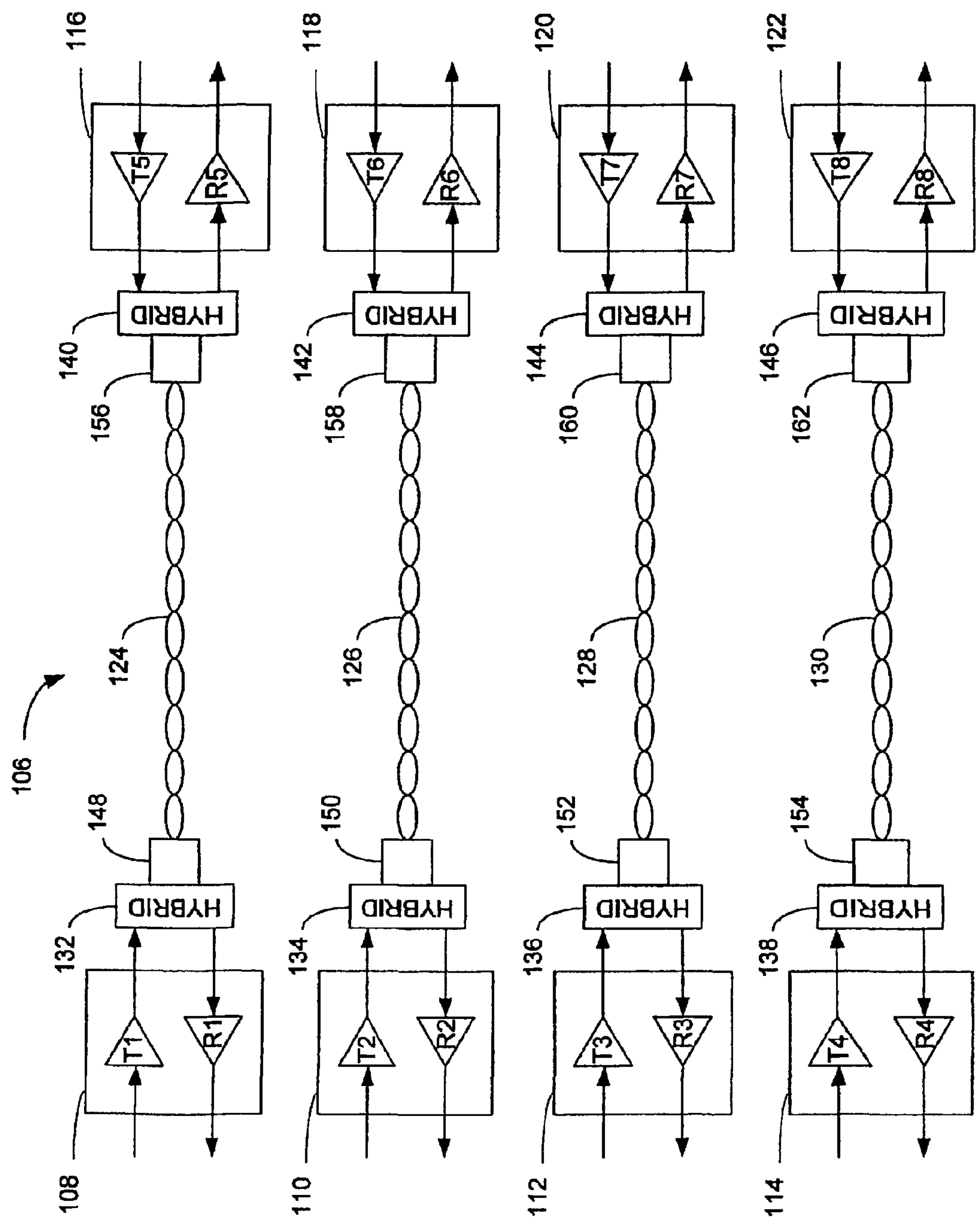
FIG. 2 is a schematic block diagram of a plurality communication channels, each with a transceiver at each end.
Figure 3:
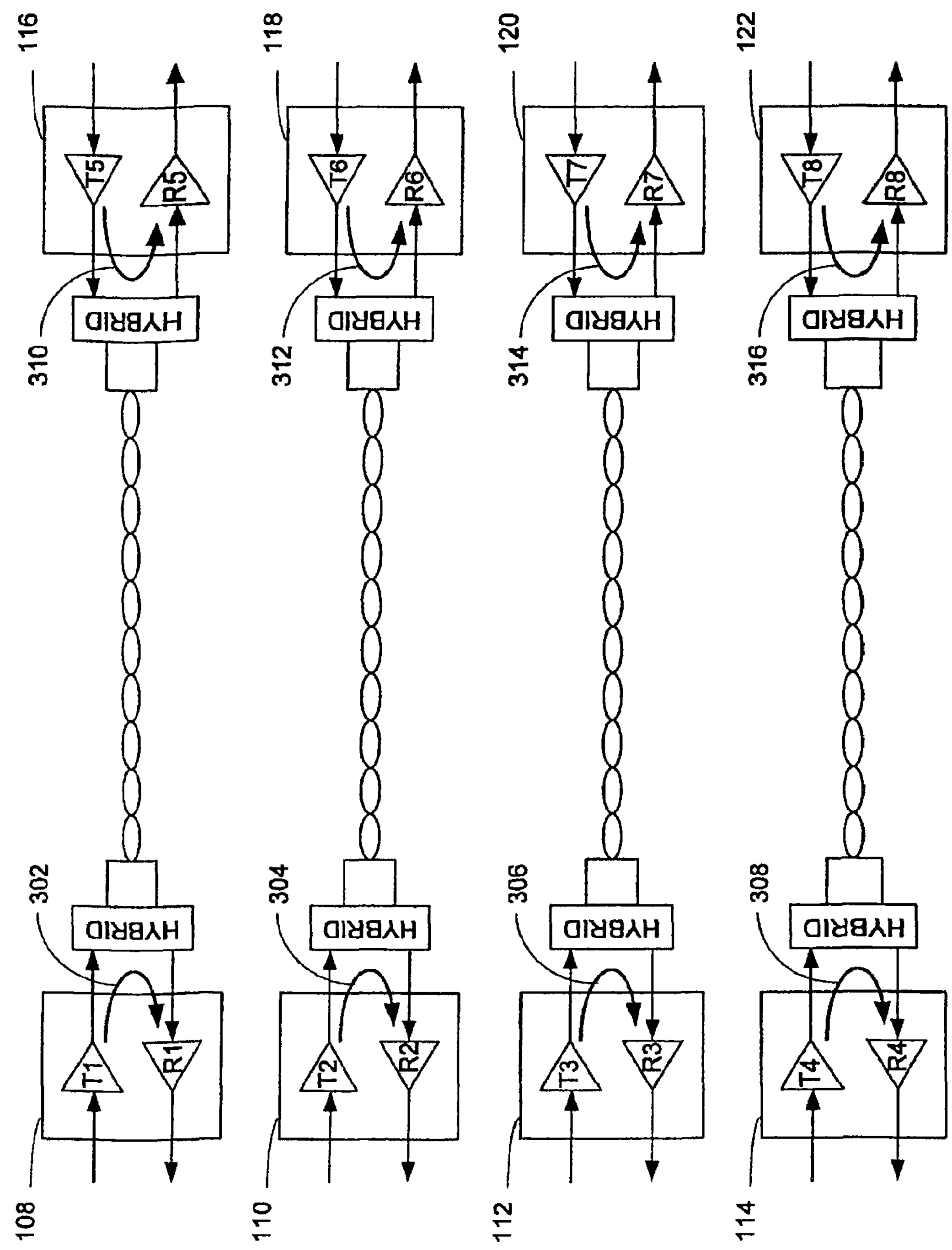
FIG. 3 is a schematic block diagram of a portion of the communication system of FIG. 2 depicting echo interference signals.
Figure 4:
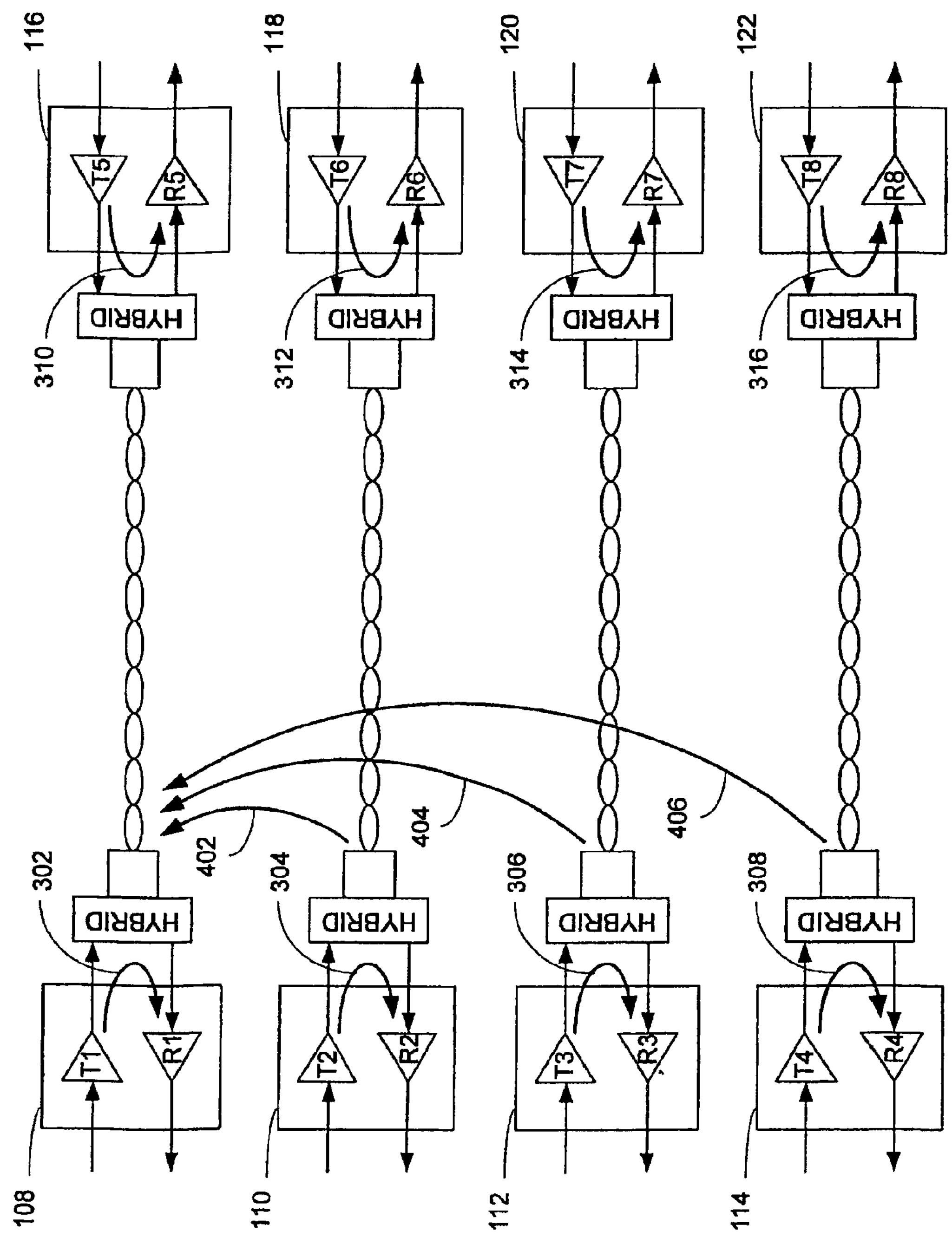
FIG. 4 is a schematic block diagram of a portion of the communication system of FIG. 2 depicting NEXT interference signals.

A communication system 600 incorporating features of the systems and methods for reducing echo and NEXT interference signals is generally shown in FIG. 6. Communication system 600 includes a network device 602 and a network device 604. As discussed above Network devices 602, 604 include computers, switches, routers, hubs, gateways, and similar devices. Two network devices are shown by way of example—communication system 600 can contain a different number of network devices. Network device 602 communicates with network device 604 through a communication line 606.

Figure 7:
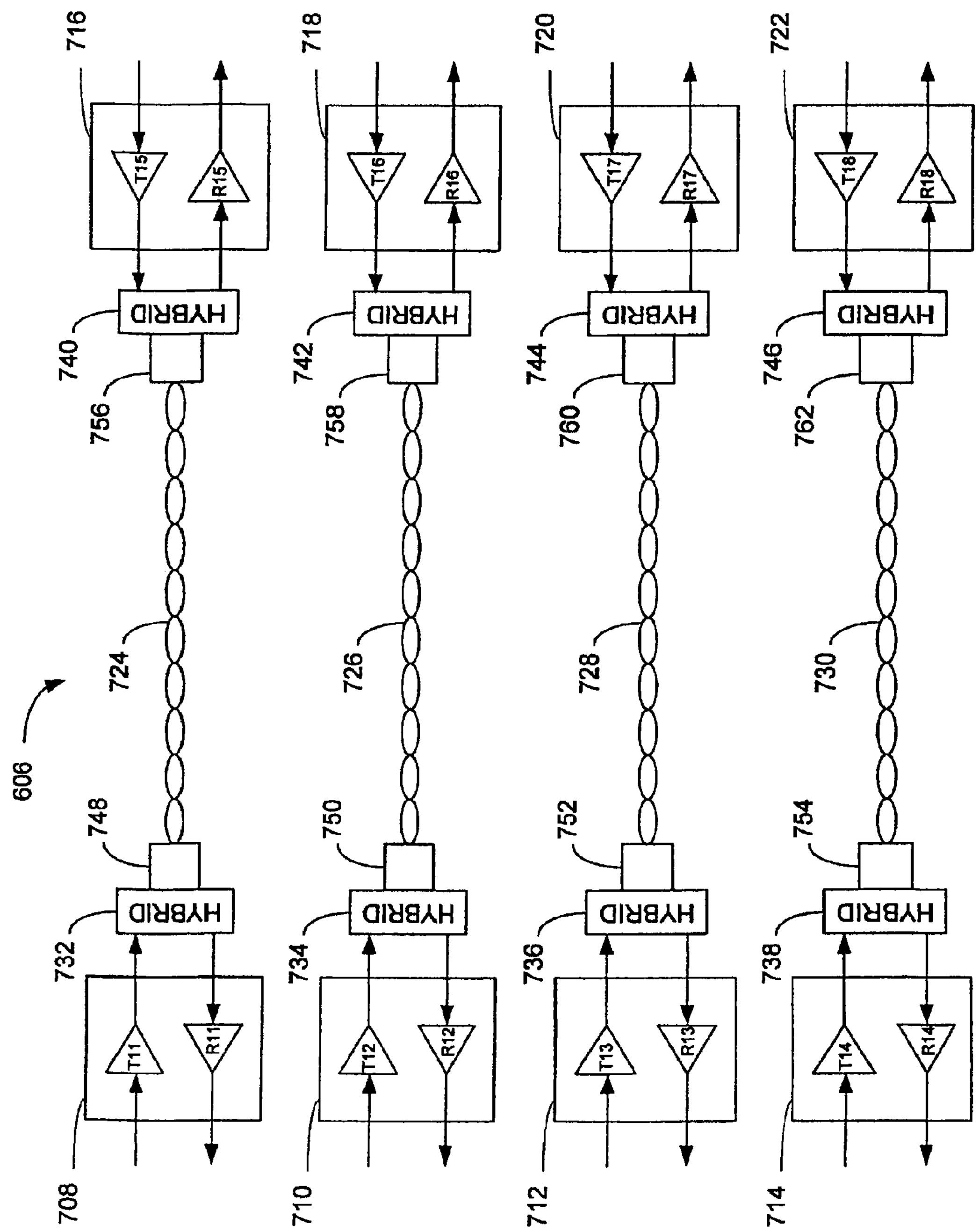
FIG. 7 is a schematic block diagram of a plurality communication channels, each with a transceiver at each end.

Referring to FIG. 7, in one implementation, communication line 606 includes four UTPs 724-730 that are connected to transceivers 708-722 through corresponding connectors 748-762. In one implementation, transceivers 748-762 are IEEE 1000Base-TX complaint. Hybrid circuits 732-746 are used at the ends of each UTP 724-730 to control access to a corresponding communication channel for full-duplex bidirectional operation.

Figure 8:
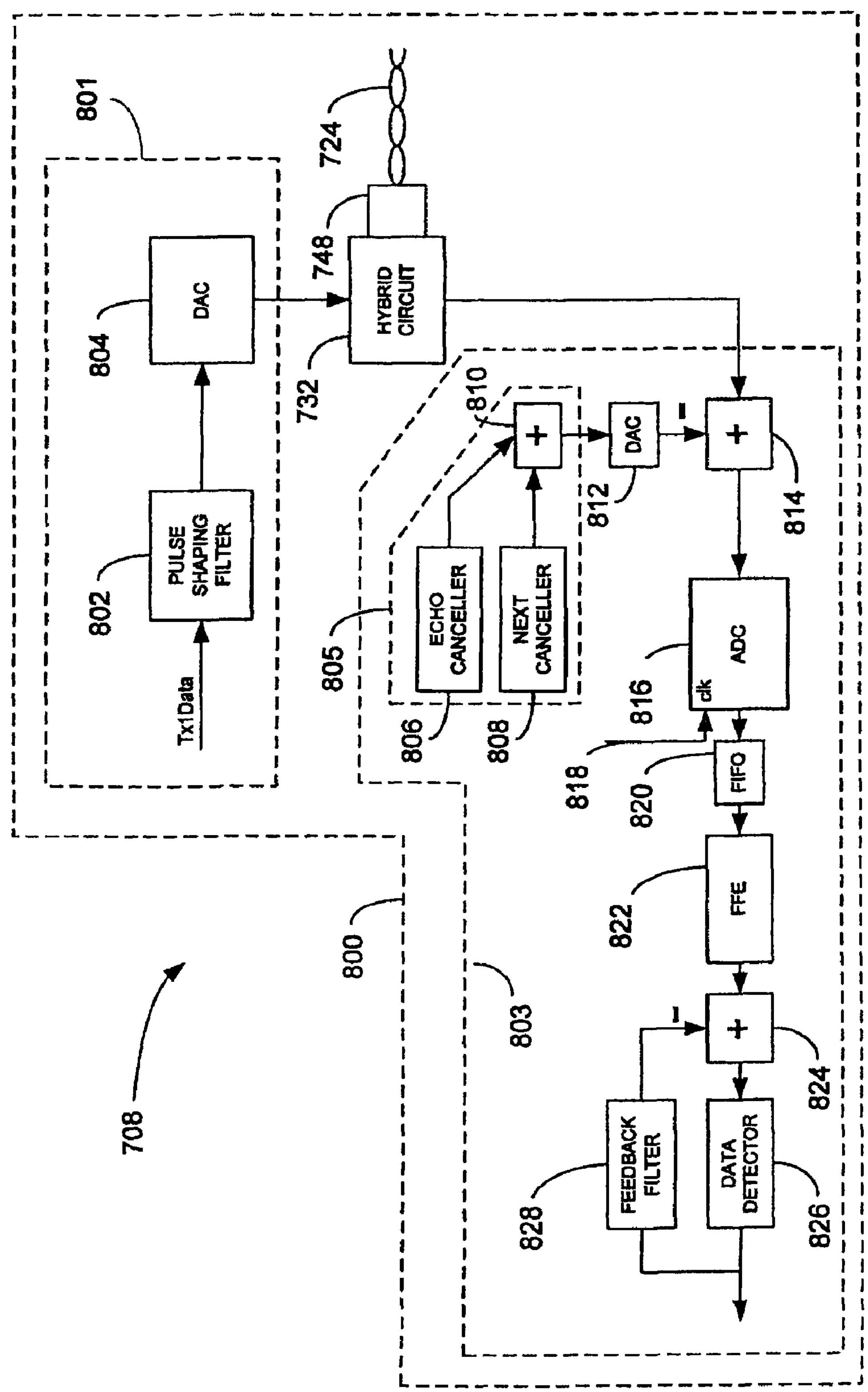
FIG. 8 is a schematic block diagram of a transceiver structure.

FIG. 8 shows one implementation of a transceiver structure 800 of transceiver 708. Transceivers 710-722 can include similar transceiver structures and operate in a similar manner. The transmitter portion 801 of transceiver 708 includes a conventional pulse shaping filter 802 and a digital-to-analog converter (DAC) 804. Pulse shaping filter 802 receives one or more data symbols (Tx1Data) to be transmitted over the first communication channel between transceiver 708 and transceiver 716. Data symbols Tx1Data transmitted by transmitter T11 pass through pulse shaping filter 802 and are converted into analog signals by DAC 804. The analog signals gain access to UTP 724 through hybrid circuit 732.

The receiver portion 803 of transceiver 708 includes a digital compensation circuit 805, an analog-to-digital converter (ADC) 816, a FIFO 820, a feed forward equalizer (FFE) 822, a data detector 826, and a feedback filter 828. Digital compensation circuit 805 generates a digital compensation signal to substantially cancel echo and/or NEXT interference signals from a received communication signal (received from transmitter T15) appearing at receiver R11. In one implementation, digital compensation circuit 805 includes an echo canceller 806 and a NEXT canceller 808.

Echo canceller 806 generates a digital replica of the echo interference signal encountered by receiver R11 of transceiver 708. In like manner, NEXT canceller 808 generates a digital replica of the NEXT interference signals encountered by receiver R11. In one implementation, the digital replica of the echo interference signal is combined with the digital replica of the echo interference signal through combiner 810. The combined digital replica of the echo and NEXT interference signals can be converted into a corresponding analog replica of the echo and NEXT interference signals through digital-to-analog converter (DAC) 812. Signal distortion caused by echo and NEXT interference is cancelled from the received communication signal by subtractor 814 (i.e., subtracting the analog replica of the echo and NEXT interference signals from the received communication signal).

In one implementation, echo canceller 806 and NEXT canceller 808 receive as inputs a stream of data symbols generated by local transmitters (e.g., transmitters R11-R14). The analog replica echo and NEXT interference signals are subtracted from the received communication signal prior to the received communication signal being sampled by ADC 816. Echo and NEXT interference signals are, therefore, removed from the received communication signal in the analog domain.

ADC 816 samples the received communication signal, that is substantially devoid of signal distortion caused by echo and NEXT interference signals, in accordance with a sample clock signal 818 and generates digital signals at a suitable frequency, for example, at 833 MHz with an 8 bit resolution. Sample clock signal 818 can be provided by a timing recovery circuit (not shown). FIFO 820 receives the digital signals and stores them on a first-in-first-out basis. FIFO 820 forwards individual digital signals to FFE 822 which filters the individual digital signals. In one implementation, FFE 822 is a least means squares (LMS) type adaptive filter which performs equalization and precursor inter-symbol interference (ISI) cancellation. Data detector 826 receives the individual filtered signals and, in combination with combiner 824 and feedback filter 828, generates an output signal corresponding to a detected data symbol. Data detector 826 can be a symbol-by-symbol detector or a sequential detector which operates on sequences of signals across all four channels, such as a Viterbi detector.

Figure 9:
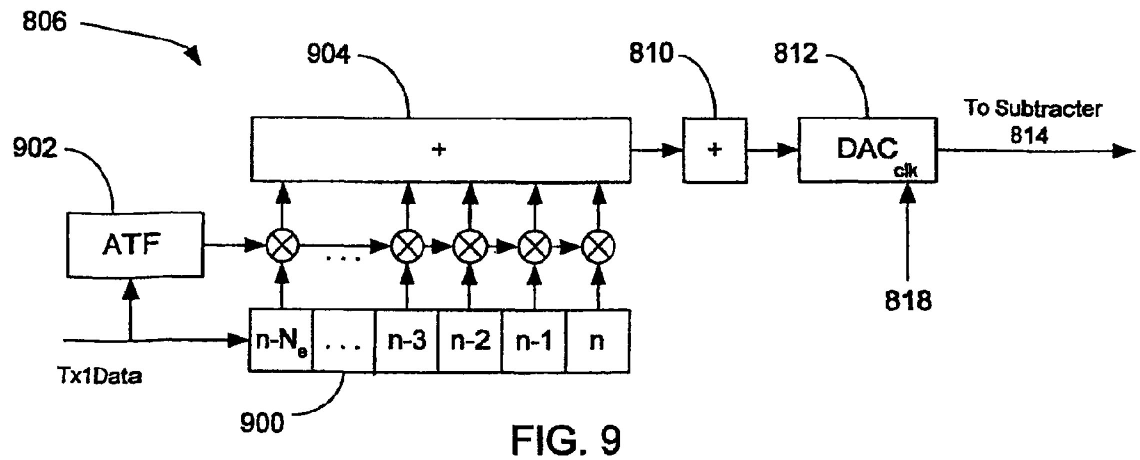
FIG. 9 is a schematic block diagram of an echo canceller of FIG. 8.

FIG. 9 shows an implementation of echo canceller 806. Echo canceller 806 includes a shift register 900, an adaptive cancellation filter 902, and a combiner 904. Shift register 900 receives data symbols Tx1Data. Shift register 900 can have a size ($N_e$) equal to a length of echo canceller 806. Adaptive cancellation filter 902 produces echo cancellation coefficients that model impulse responses of the echo interference signal encountered by receiver R11. A digital replica of the echo interference signal encountered by receiver R11 is generated by multiplying the echo cancellation coefficients with data symbols Tx1Data and summing the results through combiner 904. Adaptive cancellation filter 902 can be implemented as an adaptive transversal filter (ATF) using, for example, the LMS algorithm. The digital replica of the echo interference signal can be sent to combiner 810 and to DAC 812. DAC 812 can be clocked with clock signal 818 to ensure that echo interference signals are properly cancelled out at subtractor 814. Timing delays that may be associated with the generation of the digital replica of the echo interference signal can be compensated for by appropriate time domain manipulations of the digital replica interference signal.

As discussed above (FIG. 7), communication signals transmitted by the transmitters T11-T18 of transceivers 708-722 may cause NEXT interference signals in communication signals received by the receivers R11-R18 of transceivers 708-722. Referring again to FIG. 7, since each receiver R11-R14 has access to data symbols on the other (e.g., three) channels that may cause the NEXT interference signals, NEXT interference signals can be substantially cancelled.

Figure 10:
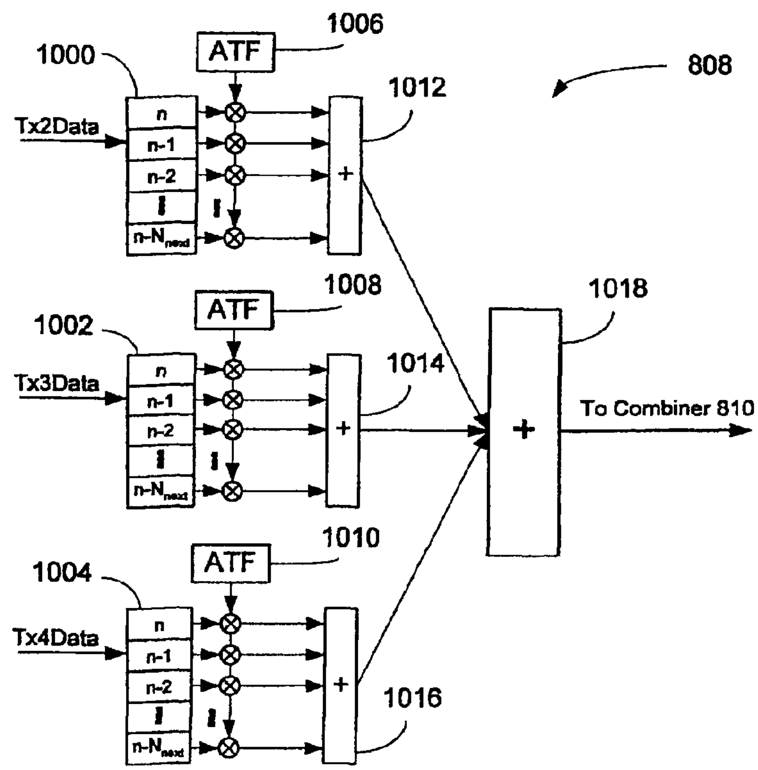
FIG. 10 is a schematic block diagram of a NEXT canceller of FIG. 8.

FIG. 10 shows an implementation of NEXT canceller 808 that substantially cancels NEXT interference signals caused by transmitters T12-T14 (FIG. 8). Next canceller 808 includes shift registers 1000-1004, NEXT adaptive filters 1006-1010, and combiners 1012-1018. Shift registers 1000-1004 receive data symbols TxData2, TxData3, and TxData4 from transmitters T2-T4, respectively. Each NEXT adaptive filter 1006-1010 generates NEXT cancellation coefficients that model impulse responses of the NEXT interference signal caused by given transmitters T12-T14, respectively. In one implementation, NEXT adaptive filters 1006-1010 are implemented as ATFs, each using the LMS algorithm. Individual digital replicas of NEXT interference signals caused by transmitters T12-T14 are generated by multiplying the NEXT cancellation coefficients with a respective one of data symbols TxData2, TxData3, and TxData4, and summing the results through combiners 1012-1016. Combiner 1018 sums the individual digital replicas of NEXT interference signals to produce a digital replica of the total NEXT interference signals encountered by receiver R11. In one implementation, the digital replica of the total NEXT interference signals is combined with the digital replica of the echo interference signal by combiner 810 and sent to subtractor 814 through DAC 812. Alternatively, any number of the individual digital replicas of the NEXT interference signals can be sent directly to DAC 812.

Figure 11:
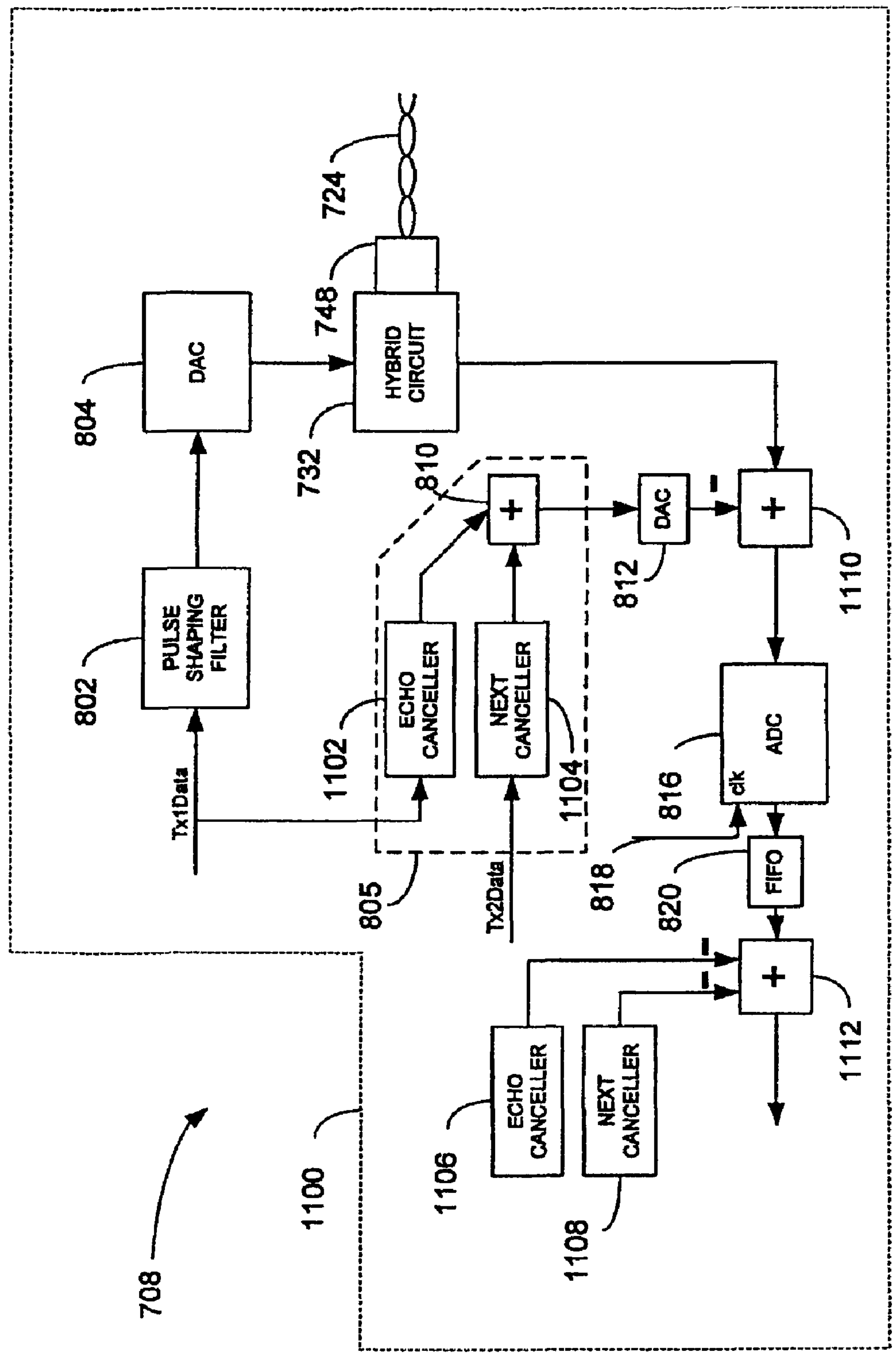
FIG. 11 is a schematic block diagram of a transceiver structure.

FIG. 11 shows an alternative implementation of a transceiver structure 1100 of transceiver 708. In the implementation shown in FIG. 11, echo canceller 1102 and/or NEXT canceller 1104 removes high voltage responses (e.g., caused by a reflection due to impedance mismatch at hybrid circuit 132 and connector 148) within a received communication signal before the received communication signal is sampled by ADC 816. The remainder of the echo and NEXT interference signals (contained in the received communication signal) that is not removed by echo canceller 1102 and NEXT canceller 1104, is removed by a conventional echo canceller 1106 and a conventional NEXT canceller 1108 in the digital domain (i.e., after the received communication signal has been sampled by ADC 816).

Figure 12:
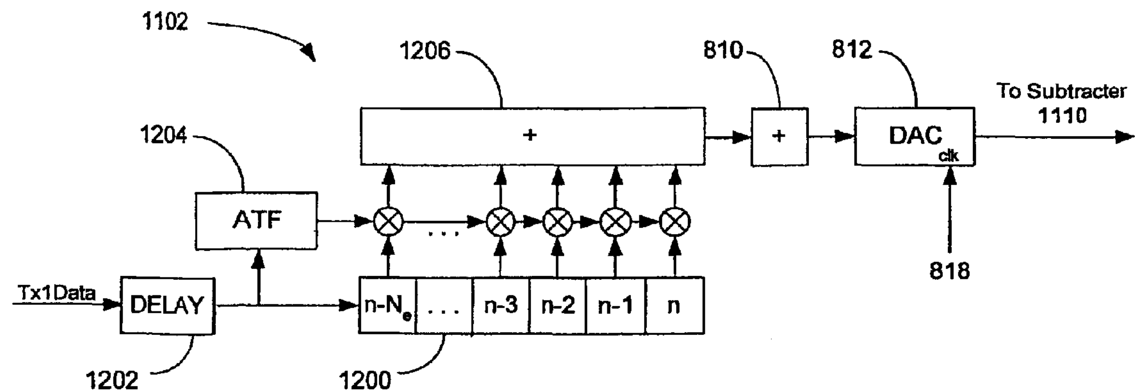
FIG. 12 is a schematic block diagram of an echo canceller of FIG. 11.

FIG. 12 shows an implementation of echo canceller 1102. NEXT canceller 1104 has the same principle operation of echo canceller 1102. Echo canceller 1102 includes a shift register 1200, a programmable delay 1202, an adaptive cancellation filter 1204, and a combiner 1206. Data symbols Tx1Data are passed into shift register 1200 after a pre-determined amount of time. The pre-determined amount of time is adjustable through programmable delay 1202 to ensure that a generated replica echo interference signal arrives substantially coincident with a received echo interference signal at subtractor 1110. Adaptive cancellation filter 1204 produces echo cancellation coefficients that model high voltage impulse responses of the echo interference signal. Adaptive cancellation filter 1204 can be implemented as an adaptive transversal filter (ATF) using, for example, the LMS algorithm. A digital replica of the high voltage echo interference signals encountered by receiver R11 is generated by multiplying the echo cancellation coefficients with data symbols Tx1Data and summing the results through combiner 1206. The digital replica of the high voltage echo interference signals can be sent to subtractor 1110 through DAC 812.

Figure 13:
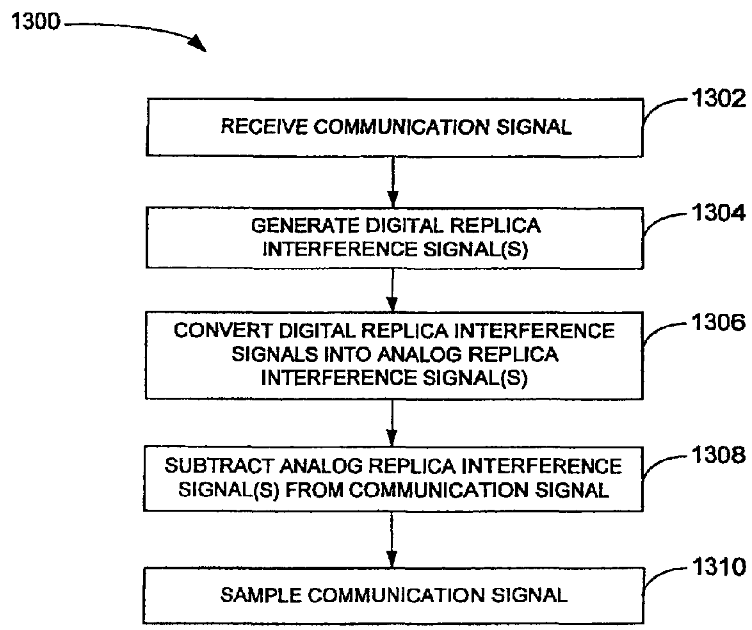
FIG. 13 illustrates a process for reducing echo and NEXT interference signals in a communication signal.

FIG. 13 shows a method 1300 for reducing echo and NEXT interference signals in a received communication signal. A communication signal is received by a receiver (step 1302). A digital replica of an interference signal (or a portion thereof) is generated (step 1304). In one implementation, a digital replica of all interference signals encountered by a receiver are generated, including echo and all NEXT interference signals encountered by a receiver. In another implementation, a digital replica of a number of the interference signals less than all of the interference signals can be generated in step 1104. The digital replica of the interference signal(s) are converted into a corresponding analog replica interference signal(s) (step 1306). The analog replica interference signal(s) are subtracted from the received communication signal (step 1308). In one implementation, the analog replica interference signal(s) are subtracted from the received communication signal to substantially remove the interference signal(s) from the received communication signal. After the replica interference signal(s) have been removed from the received communication signal, the received communication signal is then sampled by an ADC for digital processing (step 1310).

Various implementations have been described. Nevertheless, it will be understood that various modifications may be made. For example, instead of in an adaptive manner, the echo cancellers and NEXT cancellers described above can generate corresponding replica interference signals deterministically. In addition, the number of transmitters and receivers per transceiver can be different. Accordingly, other implementations are within the scope of the following claims.

What is claimed is:

1. An apparatus comprising:

a transceiver circuit to receive a communication signal that includes one or more interference signals; and a compensation circuit to generate a compensation signal to compensate for the one or more interference signals in the communication signal based on one or more cancellation coefficients and one or more data symbols, the compensation circuit to generate the one or more cancellation coefficients based on the one or more data symbols, the one or more cancellation coefficients being configured to model an impulse response.

2. The apparatus of claim 1, where the compensation circuit includes a first compensation circuit to generate a first compensation output signal and a second compensation circuit to generate a second compensation output signal different from the first compensation output signal.

3. The apparatus of claim 2, where the first compensation output signal compensates for an echo interference signal when the communication signal includes the echo interference signal.

4. The apparatus of claim 3, where the first compensation output signal is a digital replica of the echo interference signal operable to attenuate the echo interference signal.

5. The apparatus of claim 2, where the second compensation output signal compensates for a near-end-crosstalk (NEXT) interference signal when the communication includes the NEXT interference signal.

6. The apparatus of claim 5, where the second compensation output signal is a digital replica of the NEXT interference signal that attenuates the NEXT interference signal.

7. The apparatus of claim 2, further comprising a first combination circuit to generate a first combined compensation signal based on the first compensation output signal and the second compensation output signal.

8. The apparatus of claim 7, further comprising a first conversion circuit to convert the first combined compensation signal into an analog compensation signal.

9. The apparatus of claim 8, where the analog compensation signal includes an analog replica of at least one of an echo interference signal and a NEXT interference signal.

10. The apparatus of claim 8, further comprising a second combination circuit to generate a second combined compensation signal based on the analog compensation signal and the communication signal, the second combined compensation signal being devoid of the one or more interference signals.

11. The apparatus of claim 8, further comprising a clock generator to generate a clock signal, where the first conversion circuit outputs the analog compensation signal to the second combination circuit based on the clock signal to facilitate attenuation of the one or more interference signals by the analog compensation signal.

12. The apparatus of claim 1, further comprising one or more local transmitters to transmit the one or more data symbols to the compensation circuit, where the compensation circuit generates the compensation signal based on the one or more data symbols.

13. An apparatus comprising:

a transceiver circuit to receive a communication signal that includes one or more interference signals; and a compensation circuit to generate, from the communication signal, a compensation signal that models an impulse response of the one or more interference signals to compensate for the one or more interference signals in the communication signal, wherein the compensation circuit includes:

a first register to receive a first set of one or more data symbols, a first adaptive filter to generate a first set of one or more cancellation coefficients, the first set of cancellation coefficients being configured to model the impulse response of the one or more interference signals, and a first sub-compensation circuit to generate a first compensation output signal based on the first set of cancellation coefficients and the first set of data symbols, where the compensation circuit generates the compensation signal based on the first compensation output signal.

14. The apparatus of claim 13, where the compensation circuit further includes:

a second register to receive a second set of one or more data symbols different from the first set;

a second adaptive filter to generate a second set of one or more cancellation coefficients; and a second sub-compensation circuit to generate a second compensation output signal based on the second set of cancellation coefficients and the second set of one or more data symbols, where the compensation circuit generates the compensation signal based on the first compensation output signal and the second compensation output signal.

15. The apparatus of claim 14, where the compensation circuit combines the first compensation output signal and the second compensation output signal to generate the compensation signal.

16. The apparatus of claim 1, where the compensation circuit includes:

a first compensation circuit to generate a first compensation output signal;

a second compensation circuit to generate a second compensation output signal;

a third compensation circuit to generate a third compensation output signal; and a fourth compensation circuit to generate a fourth compensation output signal, where the compensation signal is generated based on the first compensation output signal, second compensation output signal, third compensation output signal and fourth compensation output signal.

17. The apparatus of claim 16, where the communication signal includes a plurality of interference signals;

the first compensation circuit and the second compensation circuit are configured to compensate a first portion of the interference signals from the communication signal; and the third compensation circuit and the fourth compensation circuit are configured to compensate a second portion of the interference signals.

18. The apparatus of claim 17, where the second portion of the interference signals include one or more interference signals not compensated by the first compensation circuit and the second compensation circuit.

19. The apparatus of claim 17, where the compensation circuit includes a sampling circuit to sample the second portion of the interference signals; and where the third compensation circuit and the fourth compensation circuit generate the second compensation output signal based on the sampled portion.

20. The apparatus of claim 17, where at least one of the first, second, third and fourth compensation circuits includes:

a programmable delay to delay the one or more data symbols by an adjustable period;

a register to receive the one or more delayed data symbols based on the adjustable period;

an adaptive filter to generate the one or more cancellation coefficients corresponding to the one or more delayed data symbols, the cancellation coefficients being configured to model the impulse response of the interference signals; and a sub-compensation circuit to generate the compensation output signal based on the one or more cancellation coefficients and the one or more data symbols.

21. The apparatus of claim 1, further comprising:

a plurality of transceiver circuits each having:

a transmitter to transmit the one or more data symbols;

a receiver to receive the communication signal having the one or more interference signals; and a plurality of compensation circuits each associated with a different transceiver circuit to generate a compensation signal to compensate for the one or more interference signals in the communication signal based on the one or more cancellation coefficients, which model an impulse response.

22. A method comprising:

receiving a communication signal that includes one or more interference signals;

generating one or more cancellation coefficients based on one or more data symbols, the one or more cancellation coefficients being configured to model an impulse response;

generating a compensation signal based on the one or more cancellation coefficients and the one or more data symbols; and applying the compensation signal to the communication signal to compensate for the one or more interference signals.

23. The method of claim 22, where receiving a communication signal includes receiving a communication signal that includes an echo interference signal and an NEXT interference signal.

24. The method of claim 23, where generating the compensation signal includes:

generating a digital replica of the echo interference signal; and generating a digital replica of the NEXT interference signal.

25. The method of claim 24, further comprising combining the digital replica of the echo interference signal and the digital replica of the NEXT interference signal to generate a combined interference signal.

26. The method of claim 25, further comprising converting the combined interference signal into a combined analog interference signal.

27. The method of claim 25, where applying the compensation signal to the communication signal includes subtracting the digital replica of the echo interference signal and the digital replica of the NEXT interference signal from the communication signal to generate an output signal that is substantially devoid of signal distortion associated with the one or more interference signals.

28. The method of claim 27, further comprising:

generating a clock signal;

sampling the output signal using the sample clock signal; and generating one or more digital signals based on the sampled output signal.

29. The method of claim 28, further comprising:

storing the one or more digital signals on a first-in-first-out basis; and filtering the one or more stored digital signals.

30. The method of claim 22, where generating the compensation signal includes:

receiving the one or more data symbols;

generating one or more cancellation coefficients for each data symbol, the one or more cancellation coefficients modeling one or more impulse responses of the one or more interference signals;

multiplying each data symbol with one or more corresponding cancellation coefficients to generate a multiplied output; and generating the compensation signal based on the multiplied output associated with each data symbol.

31. The method of claim 30, further comprising:

generating a clock signal; and converting the compensation signal into a corresponding analog compensation signal based on the clock signal.

32. A method comprising:

receiving a communication signal that includes one or more interference signals;

generating a compensation signal including modeling an impulse response of the one or more interference signals; and applying the compensation signal to the communication signal to compensate for the one or more interference signals, where generating the compensation signal includes:

receiving one or more sets of one or more data symbols, generating one or more sets of cancellation coefficients for each set of the one or more data symbols, each set of cancellation coefficients modeling an impulse response of one of the one or more interference signals, generating one or more sub-compensation signals based on the one or more sets of data symbols and the one or more sets of cancellation coefficients, and generating the compensation signal based on the one or more sub-compensation signals.

33. The method of claim 32, further comprising delaying the one or more sets of the one or more data symbols, where receiving the one or more sets of the one or more data symbols includes receiving the delayed sets of the one or more data symbols.

34. The method of claim 22, further comprising receiving the one or more data symbols from one or more local transmitters, where generating the compensation signal includes generating the compensation signal based on the one or more data symbols.

* * * * *